(12) United States Patent
Kumar et al.

(10) Patent No.: US 6,417,836 B1
(45) Date of Patent: Jul. 9, 2002

(54) COMPUTER INPUT DEVICE HAVING SIX DEGREES OF FREEDOM FOR CONTROLLING MOVEMENT OF A THREE-DIMENSIONAL OBJECT

(75) Inventors: Senthil Kumar, Aberdeen; Raymond R. Staab, Brick, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/366,012

(22) Filed: Aug. 2, 1999

(51) Int. Cl.[7] ................................................. G09G 5/00
(52) U.S. Cl. ...................... 345/156; 345/157; 345/158
(58) Field of Search ................................ 345/156, 158, 345/162, 157, 167, 166, 427

(56) References Cited

U.S. PATENT DOCUMENTS

| | | | |
|---|---|---|---|
| 4,662,752 A | * | 5/1987 | Tucker et al. ............... 356/375 |
| 4,672,562 A | | 6/1987 | Egli et al. |
| 4,761,000 A | * | 8/1988 | Fisher et al. .................... 5/608 |
| 4,811,608 A | | 3/1989 | Hilton |
| 5,045,843 A | | 9/1991 | Hansen |
| 5,128,671 A | | 7/1992 | Thomas, Jr. |
| 5,146,566 A | | 9/1992 | Hollis, Jr. et al. |
| 5,212,888 A | * | 5/1993 | Cary et al. .................... 33/18.1 |
| 5,222,400 A | | 6/1993 | Hilton |
| 5,227,985 A | | 7/1993 | DeMenthon |
| 5,230,623 A | | 7/1993 | Guthrie et al. |
| 5,297,061 A | | 3/1994 | Dementhon et al. |
| 5,335,557 A | | 8/1994 | Yasutake |
| 5,446,798 A | | 8/1995 | Morita et al. |
| 5,672,820 A | | 9/1997 | Rossi et al. |
| 5,856,844 A | | 1/1999 | Batterman et al. |
| 5,889,505 A | | 3/1999 | Toyama et al. |
| 6,172,354 B1 | * | 1/2001 | Adan et al. ................. 250/221 |

* cited by examiner

Primary Examiner—Mark Zimmerman
Assistant Examiner—Mackly Monestime
(74) Attorney, Agent, or Firm—Ryan, Mason & Lewis, LLP (57) ABSTRACT

An input device for providing position and orientation information with six degrees of freedom for use in manipulating a real or virtual three-dimensional object. An illustrative embodiment includes a handle with a plate attached to an upper portion thereof. Associated with an upper planar surface of the plate is a set of LEDs or other light sources arranged in a designated pattern. A camera or other suitable type of detection device detects light from the light sources in order to determine the position, e.g., X, Y and Z positional parameters, and orientation, e.g., roll, pitch and yaw rotational parameters, of the input device. Control software running on a computer system may be used to detect and localize the light sources that are visible in a given image generated by the camera, to associate each of the light sources with a corresponding label, to determine the position and orientation information from the positions of the light sources in the image, and to communicate the position and orientation information to at least one application running on the computer system.

26 Claims, 5 Drawing Sheets

COMPUTER INPUT DEVICE HAVING SIX DEGREES OF FREEDOM FOR CONTROLLING MOVEMENT OF A THREE-DIMENSIONAL OBJECT

FIELD OF THE INVENTION

The present invention relates generally to input devices for use with computers and other display-based processing systems, and more particularly to an input device which is capable of providing information in six degrees of freedom for controlling movement of a real or virtual object in three-dimensional space.

BACKGROUND OF THE INVENTION

Many conventional computer input devices, such as a mouse, a tracking ball or a joystick, provide control of a two-dimensional computer-generated object, e.g., a cursor on a computer screen. These devices provide two degrees of freedom in the form of two positional parameters, i.e., left-right and forward-backward movement, also known as X and Y translational position. Other conventional computer input devices provide three or more degrees of freedom. For example, there are a number of known input devices that provide control over three positional parameters, i.e., left-right, forward-backward and up-down movement, also known as X, Y, and Z translational position, as well as control over three angular or orientation parameters, i.e., roll, pitch and yaw, for a total of six degrees of freedom. Such devices provide realistic control of three-dimensional computer-generated objects in applications such as virtual reality, video games and graphical editing.

An example of an input device providing six degrees of freedom is described in U.S. Pat. No. 5,889,505 entitled "Vision-Based Six-Degree-of-Freedom Computer Input Device" and issued to Toyama et al. The position and orientation of this input device are determined by tracking a physical object suspended by cables as it is moved by a user. The tracking mechanism requires either an initialization where the tracked object is first imaged in a "home position," or a comparison of current data to previously stored data. The Z coordinate is measured by computing how far apart the pixels of the tracked object are from its centroid. Thus, this method includes all the pixels of the tracked object in its Z computation. Another problem with this approach is that it computes orientation by tracking two reference points that have different distinguishing characteristics. In other words, these reference points must be visually distinguishable. Yet another drawback of this approach is that it does not provide absolute values for the rotation and translation parameters, but only values that are proportional to the actual quantities. These values must then be scaled before being used to control applications.

U.S. Pat. No. 5,856,844, issued to Batterman et al. and entitled "Method and Apparatus for Determining Position and Orientation," describes a method for determining the six degrees of freedom of a head mounted display and a handle to which an optically-modulated target is attached. The target is marked with squares on its surface, and by tracking the perspective views of these squares, six degrees of freedom are computed. A problem with this approach is that it requires a special orientation mark in the optically-modulated target, in order to identify the ordering of the squares. Another problem is that this approach determines rotation angles directly, and is therefore unduly prone to noise-related distortions.

Techniques described in U.S. Pat. No. 5,227,985, issued to DeMenthon and entitled "Computer Vision System for Position Monitoring in Three Dimensions Using Non-Coplanar Light Sources Attached to a Monitored Object," and U.S. Pat. No. 5,297,061, issued to DeMenthon et al. and entitled "Three Dimensional Pointing Device Monitored by Computer Vision," determine position and orientation of an object by utilizing a set of non-coplanar light sources mounted on the object. A problem with this approach is that the use of non-coplanar light sources makes the device more difficult to manufacture and therefore more costly. Another problem is that the light sources used in this approach are of different sizes, in order to correctly identify the ordering of the light sources in the corresponding image, which adds additional complexity to the device.

U.S. Pat. No. 4,672,562, issued to Egli et al. and entitled "Method and Apparatus for Determining Location and Orientation of Objects," describes an input device comprising an orthogonally-related target array. The points are arranged in a very specific configuration such that the fourth target point forms a common intersection point of first, second and third line projections passing separately through the first three points and intersecting the fourth point. In addition, these line projections must form three right angles at the fourth target point. Such constraints are generally undesirable in that they can render the device difficult to manufacture and use.

In view of the above, it is apparent that a need exists for an improved input device capable of providing six degrees of freedom, while also avoiding the problems associated with the conventional approaches.

SUMMARY OF THE INVENTION

The invention provides an improved input device and related method for providing position and orientation information with six degrees of freedom for use in manipulating a real or virtual three-dimensional object. An illustrative embodiment includes a handle with a plate attached to an upper portion thereof. Associated with an upper planar portion of the plate is a set of light sources arranged in a designated pattern. A camera or other detection device detects light from the light sources in order to determine the position, e.g., X, Y and Z positional parameters, and orientation, e.g., roll, pitch and yaw rotational parameters, of the input device. Control software running on a computer system may be used to detect and localize the light sources that are visible in a given image generated by the camera, to associate each of the light sources with a corresponding label, to determine the position and orientation information from the positions of the light sources in the image, and to communicate the position and orientation information to at least one application running on the computer system.

In accordance with the invention, the control software determines the corresponding label for each of the light sources at least in part using a measure which is a function of a set of points associated with the planar surface, each corresponding to one of the light sources, with a given one of the points selected as a principal point. The measure is invariant under perspective projection, such that if the set of points associated with the planar surface are projected into an image, the measure generated for the sets of points associated with the planar surface is the same as that generated for the points as projected into the image. The control software first computes the three-dimensional positions of all the light sources, and subsequently determines the orientation information by directly calculating roll, pitch and yaw rotational parameters from computed translational vectors.

The techniques of the present invention provide a number of significant advantages over the previously-described conventional approaches. For example, an input device in accordance with the illustrative embodiment of the invention utilizes a planar arrangement of light sources, each of which may have the same characteristics, and is therefore easier to manufacture and less costly than conventional devices. No orientation marks are required and there are no constraints on the pattern of light sources as long as the sources are distinguishable using the above-mentioned measure. In addition, an input device in accordance with the invention can generate accurate positional and orientation values without any scale ambiguity. Furthermore, because the invention first computes the three-dimensional positions of all light sources and uses this information to determine the orientation, it is more robust and less prone to noise-related distortions than methods that determine rotation angles directly.

DETAILED DESCRIPTION OF THE INVENTION

Figure 1:
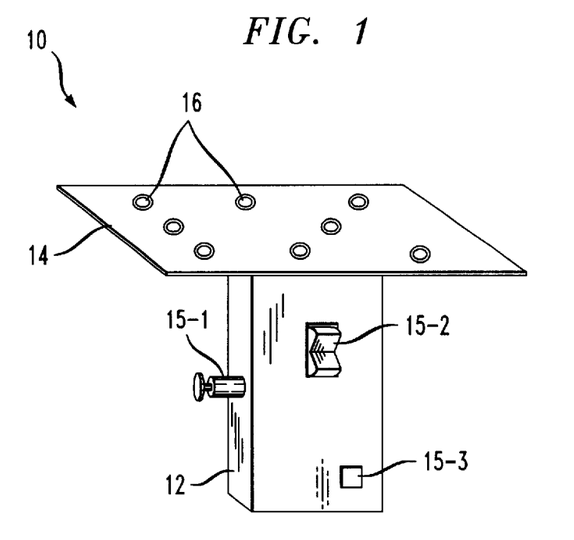
FIG. 1 shows an illustrative embodiment of an input device in accordance with the invention.

FIG. 1 shows an illustrative embodiment of an input device 10 in accordance with the invention. The input device 10 provides a minimum of three positional parameters, i.e., left-right or X, forward-backward or Y, and up-down or Z, and three angular parameters, i.e., roll, pitch and yaw, and thus six degrees of freedom for controlling, e.g., the movement of three-dimensional objects in numerous applications. The input device 10 includes a handle 12 and a plate 14 attached to the top of the handle 12.

Several light emitting devices (LEDs) 16 are mounted on an upper planar surface of the plate 14. These LEDs can be turned on and off using switches 15-1, 15-2 and 15-3 attached to the device. One of the LEDs 16 is designated as a "trigger LED" and is turned on and off using a "trigger switch" 15-1 attached to the front of the handle. When the trigger switch 15-1 is pressed, the trigger LED turns on, i.e., emits light, and when the trigger switch 15-1 is released, the trigger LED turns off, i.e., stops emitting light. The other switches 15-2 and 15-3 can control multiple LEDs simultaneously. The LEDs 16 can be of the same color or of different colors and can be arranged in a variety of different patterns. The LEDs 16 may be powered, e.g., by battery cells that are encased in the handle 12. The LEDs 16 may be, for example, light emitting diodes or other similar light emitting devices.

It should be noted that the use of LEDs 16 in the illustrative embodiment is by way of example, and alternative embodiments of the invention may use other types of light sources. It is also possible to replace one or more of the LEDs with reflective markers. The term "light source" as used herein is intended to include such reflective markers, as well as any other type of device capable or generating or directing light.

Figure 2:
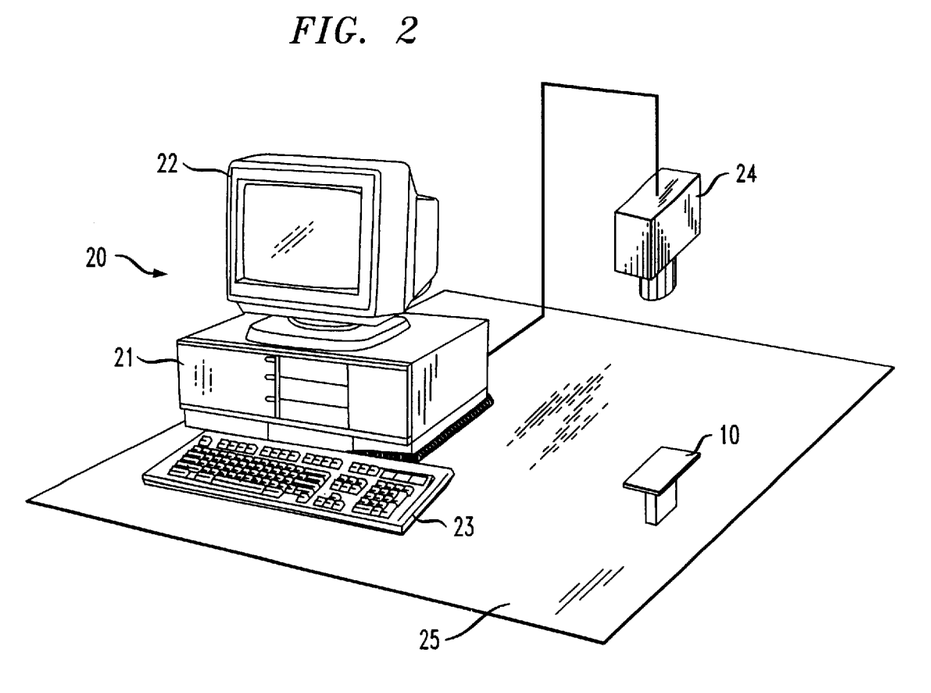
FIG. 2 shows an example of the manner in which the FIG. 1 input device is utilized in conjunction with a computer system.

FIG. 2 illustrates an exemplary configuration in which the input device of FIG. 1 operates in conjunction with a computer system 20. The computer system 20 includes a computer 21, monitor 22 and keyboard 23. A camera 24 connected to the computer 21 is positioned so as to detect light emitted from the LEDs of the input device 10. The input device 10 and computer system 20 are arranged on a flat surface 25 such as a table top or desktop. A lower portion of the handle 12 may rest directly on the surface 25, or alternatively the handle can be configured to rest on a cradle, a ball or other support device so that the device can be rotated easily. In operation, a user holds the input device 10 by its handle 12 under camera 24. When the user moves the input device 10 under the camera 24, the camera 24 sends video signals to the computer 21 and associated control software running on the computer 21 computes the three-dimensional (3D) position and orientation of the input device 10.

The 3D position is represented in terms of three numbers (X, Y, Z) and 3D orientation is represented in terms of three angles (roll, pitch, yaw). These six parameters, which are also referred to as control parameters, are used to control applications that require multi-dimensional input. An example of one such application is a 3D graphical editor which allows users to move and rotate objects. In this case, a selected object displayed on the monitor 22 can be moved and rotated in 3D by simply moving and rotating the input device 10 under the camera 24. Another example application is a computer video game in which a user controls a virtual 3D flight by moving and rotating the input device 10. The input device 10 can also be used in conjunction with applications involving the control of real-world objects, such as, e.g., robot arms.

Although FIG. 2 illustrates the operation of input device 10 in conjunction with a conventional desktop computer system 20, the input device 10 can of course be utilized with other types of information processing devices, such as portable or palmtop computers, workstations, personal digital assistants (PDAs), televisions, set-top boxes, etc. The term "computer" as used herein is intended to include these and other processor-based devices.

Figure 3:
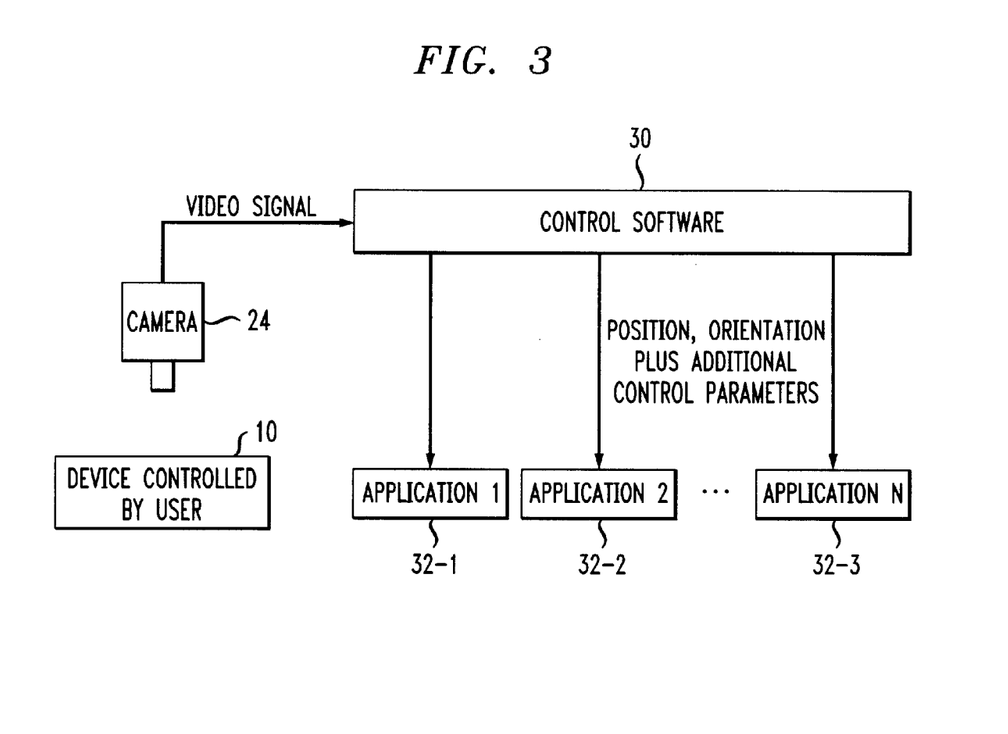
FIG. 3 is a block diagram of the system architecture of the FIG. 1 input device.

FIG. 3 is a block diagram showing the architecture of the FIG. 2 configuration. The camera 24 detects light emitted by the LEDs of device 10, and sends a corresponding video signal to a set of control software 30. The control software 30 runs on the computer 21, e.g., may be stored in an electronic or disk-based memory of computer 21 and is executed by a microprocessor or other digital data processor of the computer 21. As will be described in greater detail below, the control software 30 analyzes the images from the camera 24 in order to identify the particular LEDs that are turned on; estimates the position and orientation of the input device 10 and interprets control signals sent from device 10;

and sends this position, orientation and control signal information to applications, e.g., applications 32-1, 32-2 and 32-3, that expect control from the input device 10.

In the illustrative embodiment as described in conjunction with FIGS. 1–3, the input device 10 is wireless and the only means of communication between the device 10 and the computer 21 is through the camera 24. Alternative embodiments may include other arrangements. For example, the input device 10 may be configured to include, e.g., a direct link to the computer 24 via a cable or wireless connection. Such a direct link may be used to transmit and receive the above-noted additional control signals. As another example, the input device 10 may be configured to include a forced feedback mechanism providing tactile feedback to the user.

Figure 4:
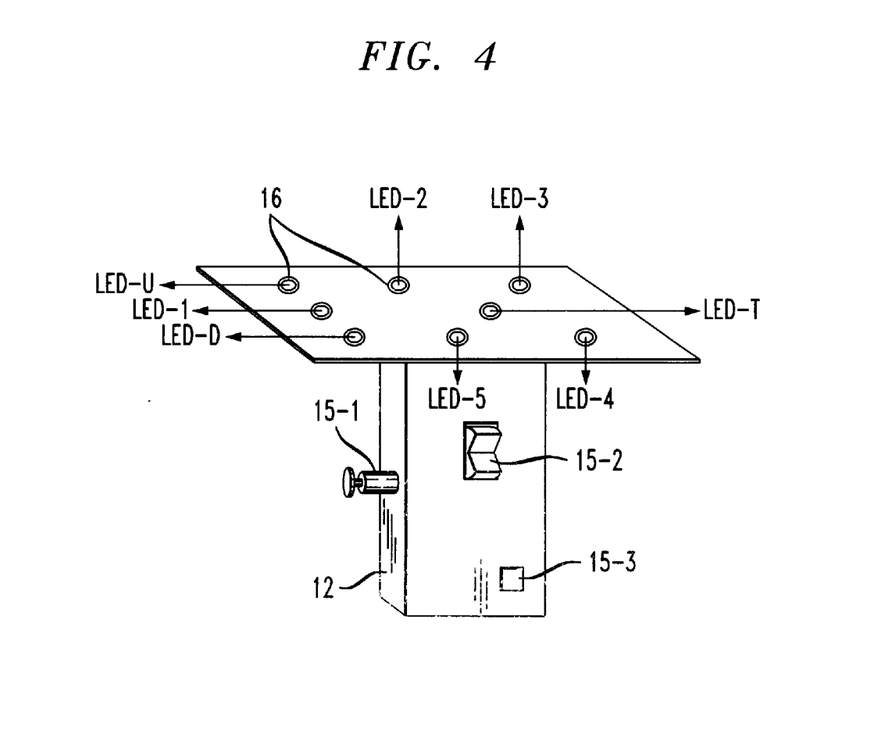
FIG. 4 shows an exemplary labeling of the LEDs in the FIG. 1 input device.

FIG. 4 shows the input device 10 with an exemplary labeling of the LEDs 16. It should be noted that the particular pattern of LEDs on the upper surface of plate 14 is exemplary only, and numerous other LED patterns may be used in other embodiments. The LEDs 16 are labeled LED-T, LED-U, LED-D, LED-1, LED-2, LED-3, LED-4 and LED-5 as shown. When the user presses the trigger switch 15-1, the trigger LED (LED-T) turns on and this is detected by the control software 30 as a "click event." This click event is then sent to all applications communicating with the control software. Although this embodiment of input device 10 includes only one trigger switch and one trigger LED, other embodiments can include as many such combinations as required.

Switch 15-2 of input device 10 controls the LEDs labeled LED-U and LED-D. These LEDs are normally off. LED-U comes on when the user presses an upper part of switch 15-2 and turns off when the upper part is released. Similarly, LED-D comes on when a lower part of switch 15-2 is pressed and turns off when the lower part is released. The switch 15-2 is configured such that LED-U comes on only when the upper part of the switch is pressed and LED-D comes on only when the lower part of the switch is pressed. Both parts cannot be pressed at the same time, and hence only one of LED-U and LED-D can be on at any given time. Switch 15-2 can be implemented in a number of different ways. For example, it can be a small stick-like protrusion that when pushed up, turns on LED-U and when pushed down, turns on LED-D.

Figure 5:
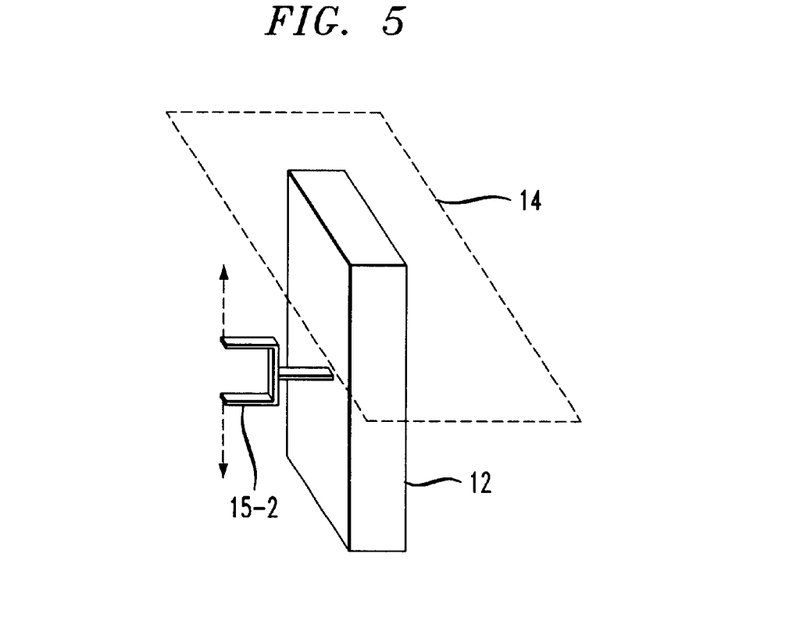
FIG. 5 shows an exemplary fork-shaped switch that may be utilized in the FIG. 1 input device.

FIG. 5 shows another possible implementation of the switch 15-2. In this implementation, the switch 15-2 comprises a fork-shaped protrusion into which the user can slide a finger, e.g., a thumb, such that the user controls the LEDs by moving the finger up and down. Other suitable arrangements, such as a ring into which the user inserts a finger, could also be used.

Switch 15-3 of input device 10 controls the LEDs labeled LED-1, LED-2, LED-3, LED-4 and LED-5. When the user desires to utilize the input device 10, switch 15-3 is flipped to an on position, and the above-noted five LEDs turn on and remain on until the switch is flipped back to an off position. These five LEDs are collectively referred to herein as "principal LEDs" and remain on whenever the switch 15-3 is in the on position. The switch 15-3 thus effectively serves as an on/off switch for the device 10.

The control software 30 will now be described in greater detail. As previously noted, the control software 30 analyzes images of the input device 10 as obtained via the camera 24, and computes the position and orientation of the device as well as additional control information. An exemplary processing algorithm implemented by the control software 30 includes the following five main steps:

1. Detection and localization of the LEDs that are visible in the image.
2. Association of each LED with its correct label.
3. Determination of the position and orientation of the device from the LED positions in the image.
4. Generation of additional control signals.
5. Communications with applications.

Each of these steps is described in detail below.

Step 1. Step 1 involves analyzing each image, e.g., frame, of the video signal generated by camera 24 to determine the pixel locations, i.e., coordinates, of the LEDs that are on. Any of a number of well-known conventional feature extraction or region extraction techniques may be used to implement this function. In the illustrative embodiment, a conventional region extraction technique is used to determine the regions in the image that correspond to the LEDs that are on. For each such LED, the algorithm computes the pixel coordinates (x, y) of the center of the corresponding region. Thus, the output of Step 1 is a set of pixel locations (x, y) that correspond to the LED centers in the image.

Step 2. Each LED 16 of the input device 10 has a unique label or name associated with it as shown in FIG. 4. As the device 10 is moved and rotated under the camera 24, each LED gets projected onto a different location in the image and the goal of Step 2 is to identify each of the LEDs in the image, i.e., to associate each LED in the image with its correct label.

Figure 6A:
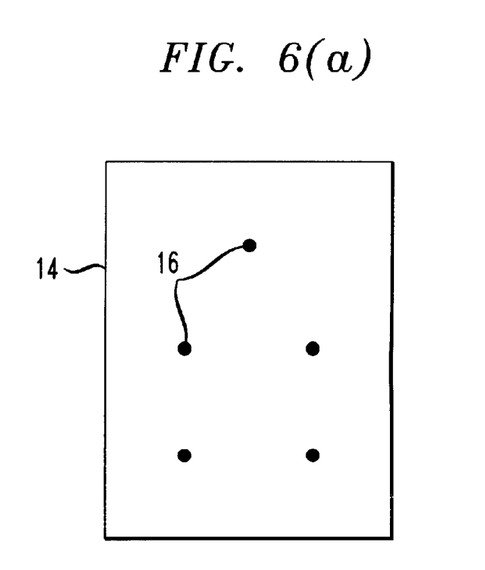
FIGS. 6(a) and 6(b) show a first example of the manner in which correct labels may be determined for each LED of an input device in accordance with the invention.
Figure 6B:
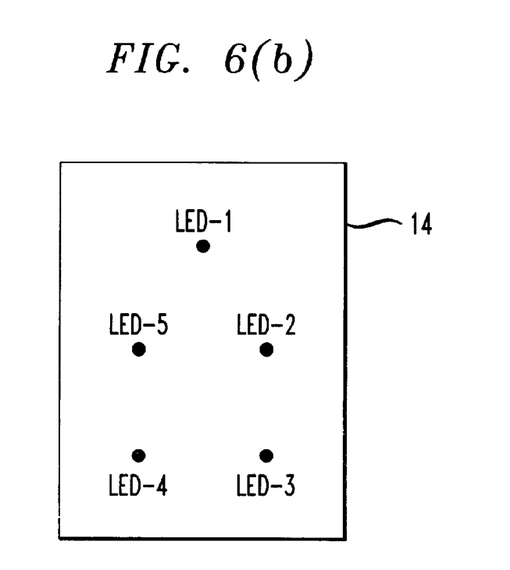
Figure 7A:
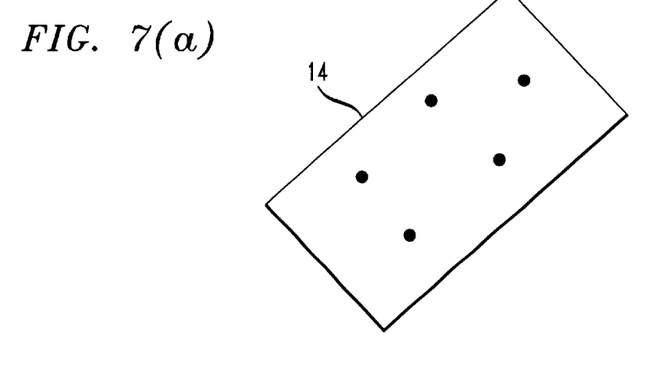
FIGS. 7(a) and 7(b) show a second example of the manner in which correct labels may be determined for each LED of an input device in accordance with the invention.
Figure 7B:
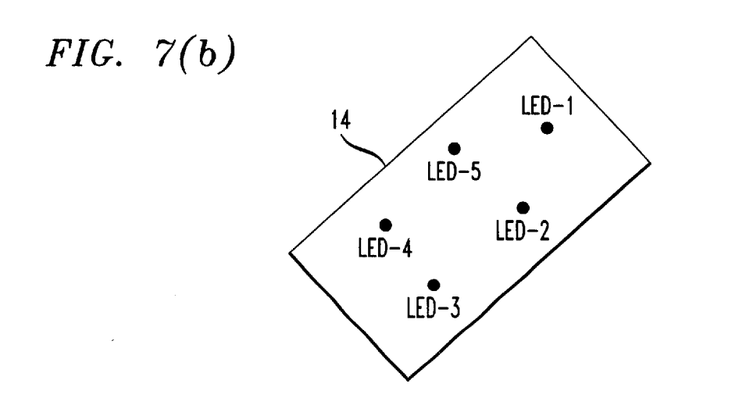

As an example, FIG. 6(a) shows how the image might look when only the principal LEDs (LED-1, ..., LED-5) are on. The above-described Step 1 of the algorithm will determine the pixel locations $(x_i, y_i)$ of the LED centers in the image. Since there are five LEDs that are visible, there will be five such $(x_i, y_i)$ pairs. Step 2 takes these pixel locations as input and determines the correct label for each LED, as illustrated in FIG. 6(b). Another example image and labeling is shown in FIGS. 7(a) and 7(b).

Step 2 can be implemented in a number of different ways. One way is to use LEDs of different colors or other physical characteristics and determine their labels based on these characteristics. Another possibility is to track the LEDs from one frame to the next using motion tracking algorithms. The latter generally requires an initialization phase in which the device 10 is shown under the camera 24 at a specific orientation so that the labels are easily determined. After this initialization phase, LEDs in the current video frame are tracked using information available from the previous frames.

A preferred implementation of Step 2 in accordance with the invention does not require LEDs of different physical characteristics and does not perform motion tracking and hence requires no initialization. This implementation is described below.

Figure 8A:
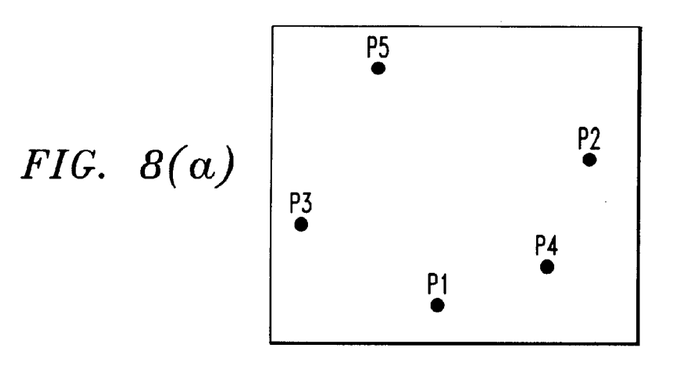
FIGS. 8(a), 8(b) and 8(c) illustrate the measure of points using a designated principal point in accordance with the invention.

Consider five points $P_1$, $P_2$, $P_3$, $P_4$ and $P_5$ that lie on a plane. Define a quantity called "basic measure" (BM) which is a function of the five points with one of them chosen as a "principal point." For example, the basic measure of the above five points with $P_5$ chosen as the principal point is denoted by $BM(P_5; P_1, P_2, P_3, P_4)$ and is computed in the following manner.

Figure 8B:
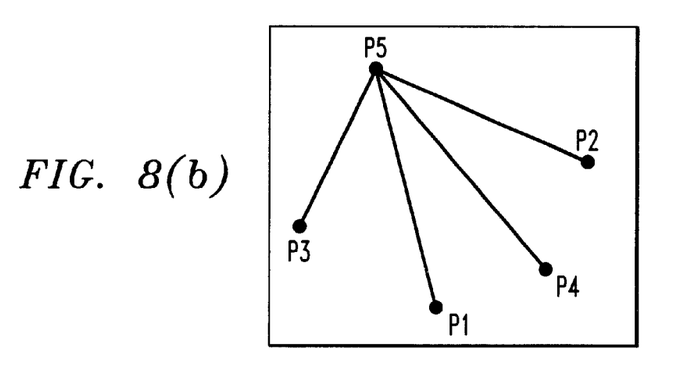
Figure 8C:
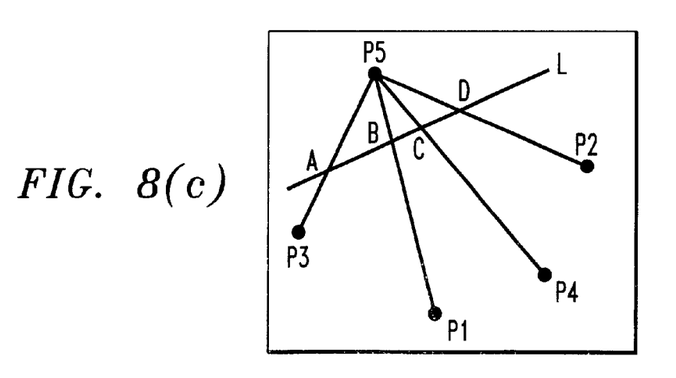

FIG. 8(a) shows the five points. To compute $BM(P_5; P_1, P_2, P_3, P_4)$, first draw line segments from $P_5$ to $P_1, P_2, P_3$ and $P_4$ as shown in FIG. 8(b). Next, as shown in FIG. 8(c), choose any line L that intersects the line segments $P_5P_1$, $P_5P_2$, $P_5P_3$ and $P_5P_4$. Let the points of intersection be A, B, C and D. These points must be labeled sequentially from left to right or right to left. Let l(XY) denote the length of the line segment joining points X and Y. Then, the basic measure of the five points with $P_5$ chosen as the principal point is defined by $$BM(P_5; P_1, P_2, P_3, P_4) = \frac{l(AC)l(BD)}{l(AD)l(BC)}. \quad (1)$$

It can be shown that the above basic measure is invariant under perspective projection, where perspective projection refers to a mathematical model of the camera which models the image formation process in which 3D objects in a scene are projected through a lens to form an image. More particularly, if the five points $P_1$, $P_2$, $P_3$, $P_4$ and $P_5$ are imaged by the camera and if $p_1$, $p_2$, $p_3$, $p_4$ and $p_5$ are the respective projections of these points in the image, then the basic measure of the original points with $P_i$ chosen as the principal point is exactly the same as the basic measure of the image points with $p_i$ chosen as the principal point, i.e., $BM(P_1; P_2, P_3, P_4, P_5)=BM(p_1; p_2, p_3, p_4, p_5)$, $BM(P_2; P_1, P_3, P_4, P_5)=BM(p_2; p_i, p_3, p_4, p_5)$, and so on. This invariance of basic measure under perspective projection is used by Step 2 of the algorithm to determine the correct label of each LED in the image, in the manner described below.

Consider first the case where only the five principal LEDs, LED-1, LED-2, . . . , LED-5 are on. Let $BM_i$ denote the basic measure of the five LEDs with LED-i chosen as the principal. In the remaining description, depending on the context, the term "LED" may refer to the physical LED, the point at the center of the physical LED, or the point at the center of the LED's projection in the image. Since the exact locations of the LEDs on the input device 10 are known, all five $BM_i$ values are also known. The LEDs are arranged such that $BM_i$ is significantly different from the other $BM_j$ values.

Step 2 of the control software algorithm determines the labels of the LEDs as follows. As previously noted, Step 1 gives the centers of the five LEDs in the image, but it is not known which LED is which. Step 2 arbitrarily chooses one of these points and computes the basic measure of the five points with the chosen point as the principal point. If this basic measure is equal to $BM_i$, the chosen point is LED-1. If not, the process is repeated with a different point as the principal point until LED-1 is determined. Once LED-1 is determined, the geometry of the LED arrangement is sufficient to identify the labels of the other LEDs. For example, LED-2 and LED-5 are closer to LED-1 than LED-3 and LED-4. This allows the former to be distinguished from the latter. Also, with LED-1 chosen as the origin, the anticlockwise angle from LED-5 to LED-2 is smaller than that from LED-2 to LED-5, such that it is possible to distinguish between LED-2 and LED-5. A similar argument applies to LED-3 and LED-4.

If the trigger LED (LED-T) is also lit, it is labeled first, before the others. There are a number of ways of identifying LED-T. One is to use the fact that LED-T is inside a convex polygon formed by the principal LEDs.

LED-U and LED-D are positioned on the device such that they too can be easily labeled using either the basic measure or the geometry. In the most general case, one would have to compute multiple basic measures to account for the various possible combinations.

Different color LEDs could be used to aid in the labeling process, but a color camera would then be required.

Step 3. This step determines the position and orientation of the input device 10 from the positions of the LEDs in the image. This step uses only the principal LEDs whose image coordinates and labels are known from the above-described Steps 1 and 2.

Consider the case of N points that lie on a plane. Assume that the exact locations of these points are known. Choose an arbitrary point on the plane as the origin and select a coordinate system, referred to herein as the "world coordinate system," such that the plane corresponds to the X-Y plane. Since the locations of the N points are known, their coordinates with respect to the selected coordinate system are also known. These coordinates will be of the form $(X_i, Y_i, Z_i)$ for i=1, 2, . . . , N. Since the plane corresponds to the X-Y plane, all $Z_i$'s are zero.

Figure 9:
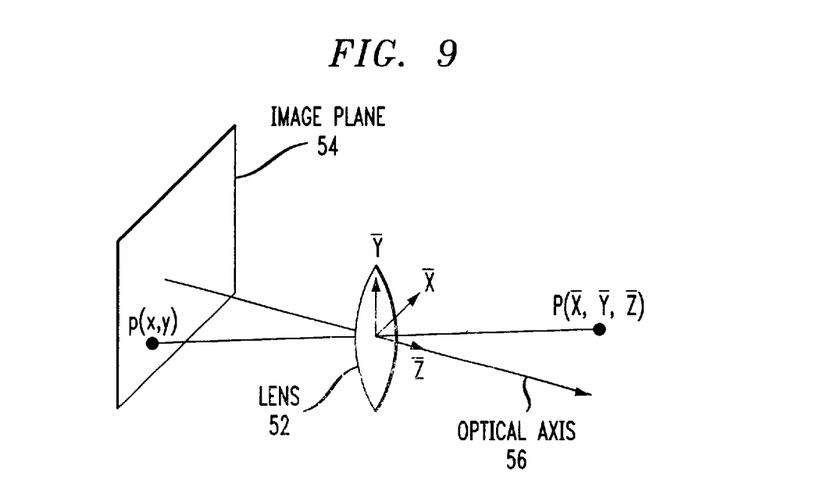
FIG. 9 shows an exemplary imaging geometry of an input device in accordance with the invention.

FIG. 9 shows the geometry of the imaging process for a point P and its image p. It also shows a coordinate system associated with the camera 24. The origin of this "camera coordinate system" is at the center of a lens 52 of the camera 24, its X-Y plane is parallel to the image plane 54 and its Z axis coincides with the optical axis 56 of the camera 24. If the point P has coordinates $(\overline{X}, \overline{Y}, \overline{Z})$ in this camera coordinate system, then P and p are related by the following equations:

$$x = F\frac{\overline{X}}{\overline{Z}} \quad (2)$$

$$y = F\frac{\overline{Y}}{\overline{Z}}. \quad (3)$$

Here (x, y) denotes the pixel coordinates of the image p and F is the product of the focal length of the lens 52 and a scale factor that is determined by pixel size.

If the point P has coordinates (X, Y, Z) in a world coordinate frame, then (X, Y, Z) and $(\overline{X}, \overline{Y}, \overline{Z})$ are related by the following expressions $$\overline{X}=R_{11}X+R_{12}Y+R_{13}Z+T_X \quad (4)$$

$$\overline{Y}=R_{21}X+R_{22}Y+R_{23}Z+T_Y \quad (5)$$

$$\overline{Z}=R_{31}X+R_{32}Y+R_{33}Z+T_Z \quad (6)$$

where $R_{ij}$ is an entry of a rotation matrix R and $T_X$, $T_Y$, $T_Z$ are the entries of a translation vector T that determines the transformation between the two coordinate systems.

Combining the above two sets of equations leads to the following relationship between the world coordinates of P and the pixel coordinates of its image p:

$$x = F\frac{R_{11}X + R_{12}Y + R_{12}Z + T_X}{R_{31}X + R_{32}Y + R_{33}Z + T_Z} \quad (7)$$

$$y = F\frac{R_{21}X + R_{22}Y + R_{23}Z + T_Y}{R_{31}X + R_{32}Y + R_{33}Z + T_Z} \quad (8)$$

In the case of the input device 10, there are N points (LEDs) that lie on a plane. The coordinates $(X_i, Y_i, Z_i)$ of these points are known with respect to a coordinate system attached to the plane. The pixel coordinates $(x_i, y_i)$ of the projections of the points in the image have already been determined, and the objective is to determine the position and orientation of the device, i.e. to determine the rotation matrix R and the translation vector T. A method for determining the translation vector T will be described first.

Each point $(X_i, Y_i, Z_i)$ on the input device 10 yields two equations as given by equations (7) and (8) above. Since the Z coordinates of these points are zero in the chosen world coordinate frame, the above equations become $$x_i = F \frac{R_{11}X_i + R_{12}Y_i + T_X}{R_{31}X_i + R_{32}Y_i + T_Z} \quad \forall i = 1, 2, \ldots, N \tag{9}$$

$$y_i = F \frac{R_{21}X_i + R_{22}Y_i + T_Y}{R_{31}X_i + R_{32}Y_i + T_Z} \quad \forall i = 1, 2, \ldots, N. \tag{10}$$

The above equations can be rewritten as:

$$R_{31}X_i x_i + R_{32}Y_i x_i + T_Z x_i = F R_{11} X_i + F R_{12} Y_i + F T_X \tag{11}$$

$$R_{31}X_i y_i + R_{32}Y_i y_i + T_Z y_i = F R_{21} X_i + F R_{22} Y_i + F T_Y \tag{12}$$

$\forall i=1, 2, \ldots N$. Dividing the above equations by $T_Z$ and rewriting yields:

$$\frac{F}{T_Z}R_{11}X_i + \frac{F}{T_Z}R_{12}Y_i + \frac{F}{T_Z}T_X - \frac{R_{31}}{T_Z}X_i x_i - \frac{R_{32}}{T_Z}Y_i x_i = x_i \tag{13}$$
$\forall i = 1, 2, \ldots, N$ $$\frac{F}{T_Z}R_{21}X_i + \frac{F}{T_Z}R_{22}Y_i + \frac{F}{T_Z}T_Y - \frac{R_{31}}{T_Z}X_i y_i - \frac{R_{32}}{T_Z}Y_i y_i = y_i \tag{14}$$
$\forall i = 1, 2, \ldots, N$.

The above set of equations gives a system of 2N linear equations in the following eight unknowns:

$$\left[\frac{F}{T_Z}R_{11}, \frac{F}{T_Z}R_{12}, \frac{F}{T_Z}R_{21}, \frac{F}{T_Z}R_{22}, \frac{R_{31}}{T_Z}, \frac{R_{32}}{T_Z}, \frac{F}{T_Z}T_X, \frac{F}{T_Z}T_Y\right]. \tag{15}$$

Since in the illustrative embodiment there are a minimum of five LEDs that are on at any given time, there are always at least ten equations and hence the above-described system can be solved for the unknown parameters.

After these eight parameters are determined, $T_X$, $T_Y$, $T_Z$ are computed as follows. Let $$\left[\frac{F}{T_Z}R_{11}, \frac{F}{T_Z}R_{12}, \frac{F}{T_Z}R_{21}, \frac{F}{T_Z}R_{22}, \frac{R_{31}}{T_Z}, \frac{R_{32}}{T_Z}, \frac{F}{T_Z}T_X, \frac{F}{T_Z}T_Y\right] = \tag{16}$$
$$[a, b, c, d, e, f, g, h].$$

Also, let $$\alpha = \frac{F}{T_Z}.$$

Then $$R_{11} = \frac{a}{\alpha}; \quad R_{12} = \frac{b}{\alpha}; \quad R_{21} = \frac{c}{\alpha}; \quad R_{22} = \frac{d}{\alpha}. \tag{17}$$

The quantities $R_{ij}$ ($i=1, 2, 3$; $j=1, 2, 3$) are the entries of the rotation matrix R and hence they obey following equations:

$$R_{11}^2 + R_{21}^2 + R_{31}^2 = 1 \tag{18}$$

$$R_{12}^2 + R_{22}^2 + R_{32}^2 = 1 \tag{19}$$

$$R_{11}R_{12} + R_{21}R_{22} + R_{31}R_{32} = 0 \tag{20}$$

After straightforward algebraic manipulation, the equations (17) through (20) yield the following expression for $\alpha$:

$$\alpha^2 = \frac{1}{2}\left[B \pm \sqrt{B^2 - 4(ad - bc)^2}\right] \tag{21}$$

where $B = a^2 + b^2 + c^2 + d^2$.

There are two choices for $\alpha$ depending on whether the plus sign or minus sign in equation (21) is chosen. To decide on the right choice, first note that a can never be zero because $$\alpha = \frac{F}{T_Z}$$

and F cannot be zero. Now, if the minus sign in equation 21 is chosen, then $\alpha^2 = 0$ when $ad - bc = 0$. This happens, for instance, when R is the identity matrix. This implies that the positive sign in equation (21) should be chosen rather than the negative sign. Choosing the positive sign gives the following expression for $\alpha$:

$$\alpha^2 = \frac{1}{2}\left[B + \sqrt{B^2 - 4(ad - bc)^2}\right]. \tag{22}$$

Now, $\alpha$ is positive because $F > 0$ and $T_Z > 0$ ($T_Z > 0$ because the device 10 is held in front of the camera 24 in the illustrative embodiment). Therefore, to get $\alpha$, take the positive square-root of the expression for $\alpha^2$ given by equation (22). Having determined $\alpha$, determine $T_X$ and $T_Y$ (see equation (16)) as $$T_X = \frac{g}{\alpha} \quad T_Y = \frac{h}{\alpha} \tag{23}$$

Also, $T_Z$ is given by $$T_Z = \frac{F}{\alpha}. \tag{24}$$

Since g and h are known, $T_X$ and $T_Y$ have been completely determined. However, F is still unknown and hence $T_Z$ is determined only up to the unknown scale factor F.

Now that $\alpha$ has been solved for, the entries $R_{ij}$ of the rotation matrix R can be readily solved for, and then the orientation of the device in terms of roll, pitch and yaw angles can be determined. However, this procedure is generally not robust and yields very noisy results. The primary reason is that determining R as described above yields only an approximate estimate for R, due to measurement errors, and such an approximate estimate, in turn, can yield very poor estimates for the roll, pitch and yaw rotation angles.

A preferred implementation that is very robust and yields superior estimates for the rotation angles is given below.

In the above-described determination of the translation ($T_X$, $T_Y$, $T_Z$) of the origin of the world coordinate frame with respect to the camera coordinate system, since $T_Z$ was determined only up to a scale factor, this result can be written as ($T_X$, $T_Y$, $\overline{T}_Z$) where $$\overline{T}_Z = \frac{T_Z}{F} = \frac{1}{\alpha}.$$

The following procedure can then be used to determine the rotation angles.

As previously noted, the illustrative embodiment of the device 10 has five points, i.e, the principal LEDs, that are visible all the time. First, a world coordinate system is chosen such that its origin is at LED-1 and its X-Y plane coincides with the upper planar surface of the device 10. Then, the procedure described above is used to determine the translation of the origin of the world coordinate system with respect to the camera 24, denoted $(T_X^1, T_Y^1, \overline{T}_Z^1)$. This gives the position of LED-1 with respect to the camera 24 (except for the unknown scale factor in $T_Z$).

Then another world coordinate system is chosen that differs from the previous one by a translation, i.e., the origin of the new coordinate system is chosen to be at LED-2 instead of LED-1. The translation of this new system is then determined with respect to the camera 24. This gives the position $(T_X^2, T_Y^2, \overline{T}_Z^2)$ of LED-2 with respect to the camera. This process is repeated with the other three principal LEDs to determine the positions $(T_X^i, T_Y^i, \overline{T}_Z^i)$ of all the principal LEDs with respect to the camera 24.

The next step is to determine the scale factor F associated with $T_Z$. This is easily done because the actual distances between the LEDs is known. For example, let $D_{12}$ be the known distance between LED-1 and LED-2. Then $$D_{12}^2 = (T_X^1 - T_X^2)^2 + (T_Y^1 - T_Y^2)^2 + (T_Z^1 - T_Z^2)^2. \quad (25)$$

But, since $T_Z^i = F\overline{T}_Z^i$, $$D_{12}^2 = (T_X^1 - T_X^2)^2 + (T_Y^1 - T_Y^2)^2 + F^2(\overline{T}_Z^1 - \overline{T}_Z^2)^2. \quad (26)$$

from which F can be computed. Once F is computed, $T_Z^i$ is computed using the expression $T_Z^i = F\overline{T}_Z^i$. The above procedure gives the positions $(T_X^i, T_Y^i, T_Z^i)$ of the principal LEDs with respect to the camera. Given this information, the orientation of the device can be computed based on the arrangement of LEDs. For example, for the arrangement shown in FIG. 4, the roll, pitch and yaw angles are given by the following expressions:

$$yaw = \frac{1}{3}\left[\tan^{-1}\left(\frac{T_X^1 - T_X^2}{T_Y^1 - T_Y^2}\right) + \tan^{-1}\left(\frac{T_X^0 - T_X^5}{T_Y^0 - T_Y^5}\right) + \tan^{-1}\left(\frac{T_X^4 - T_X^3}{T_Y^4 - T_Y^3}\right)\right] \quad (27)$$

$$roll = \frac{1}{2}\left[\tan^{-1}\left(\frac{T_Z^4 - T_Z^1}{T_X^4 - T_X^1}\right) + \tan^{-1}\left(\frac{T_Z^3 - T_Z^2}{T_X^3 - T_X^2}\right)\right] \quad (28)$$

$$pitch = \frac{1}{3}\left[\tan^{-1}\left(\frac{T_Z^1 - T_Z^2}{T_Y^1 - T_Y^2}\right) + \tan^{-1}\left(\frac{T_Z^4 - T_Z^3}{T_Y^4 - T_Y^3}\right) + \tan^{-1}\left(\frac{T_Z^0 - T_Z^5}{T_Y^0 - T_Y^5}\right)\right] \quad (29)$$

The position (X, Y, Z) of the device with respect to the camera is chosen to be the average of the five quantities $(T_X^i, T_Y^i, T_Z^i)$ $\forall i=1, 2, \ldots, 5$.

Step 4. This step generates additional control signals based on the status of the LEDs. Although it is possible to have any number of additional control signals, the following are three examples:

1. Trigger Signal. The trigger signal is generated when the trigger LED (LED-T) is on. The user can cause the generation of this signal by pressing the trigger switch 15-1. The trigger signal is sent to applications and is substantially the same as a "click event" signal generated by a conventional mouse. By incorporating multiple trigger switches and multiple trigger LEDs in the input device, multiple trigger signals can be provided.

2. Up Signal. The up signal is generated when LED-U turns on. This signal is typically used by applications to move a viewpoint or an object in an upward direction, but can also be used for other operations.

3. Down Signal. The down signal is generated when LED-D turns on. This signal is typically used by applications to move a viewpoint or an object in a downward direction, but can also be used for other operations.

The up and down signals can be used by applications to control the Z-coordinate. In such cases, the user does not have to move the device up (or down) to change the Z-coordinate. The user can instead comfortably rest his or her arm (on a table, for example) and control the Z-coordinate by controlling switch 15-2 (which, in turn, controls LED-U and LED-D).

Step 5. This step involves communicating information to the applications. This step sends the position and orientation parameters and additional control signals to applications that are controlled by the device. This step can use standard communication methods that are well-understood in the art and will therefore not be described in detail herein.

The above-described illustrative embodiment of the input device 10 may be modified to include one or more additional features. For example, as previously noted, the control signals, e.g., the up, down and trigger signals, can be sent directly to the computer 21 using an electrical cable or through a wireless channel such as an infrared channel. This will eliminate the need for LED-U, LED-D and LED-T. Note that any number of such signals can be sent directly to the computer 21. As another example, the device 10 can be configured to receive signals back from the computer 21 and use those signals to provide forced feedback to the user. Such forced feedback may use existing well-known electro-mechanical techniques.

It should be emphasized that the exemplary devices and techniques described herein are intended to illustrate the operation of the invention, and therefore should not be construed as limiting the invention to any particular embodiment or group of embodiments. For example, although illustrated herein using an LED-based device with a particular pattern of LEDs, alternative embodiments of the invention can use other types of light sources arranged in other configurations. As another example, the structure of the input device as shown in FIG. 1 may be changed in other embodiments, e.g., other types, shapes and arrangements of handles or plates could be used, and the manner in which such elements are interconnected could be altered. These and numerous other alternative embodiments within the scope of the following claims will therefore be apparent to those skilled in the art.

What is claimed is:

1. An input device for providing position and orientation information with a number of degrees of freedom, the device comprising:

a handle; and a plate attached to an upper portion of the handle and having a planar surface, the planar surface having a set of five principal light sources arranged thereon, the position and orientation information associated with the input device having six degrees of freedom and being determinable utilizing the five principal light sources, such that a detection device arranged in proximity to the planar surface detects light from the set of five principal light sources in order to determine the position and orientation information.

2. The input device of claim 1 wherein the detection device comprises a camera, and further wherein control software of a computer system processes images generated by the camera to determine the position and orientation information.

3. The input device of claim 2 wherein the control software detects and localizes the light sources that are visible in a given one of the images, associates each of the light sources with a corresponding label, determines the position and orientation information from the positions of the light sources in the image, and communicates the position and orientation information to at least one application running on the computer system.

4. The input device of claim 3 wherein the control software determines the corresponding label for each of the light sources at least in part using a measure which is a function of a set of corresponding points associated with the planar surface, with a given one of the points selected as a principal point.

5. The input device of claim 4 wherein the measure is invariant under perspective projection, such that if the set of points associated with the planar surface are projected into an image, the measure generated for the sets of points associated with the planar surface is the same as that generated for the points as projected into the image.

6. The input device of claim 2 wherein the control software determines the orientation information by directly calculating roll, pitch and yaw rotational parameters from computed translational vectors.

7. A method for providing position and orientation information with a number of degrees of freedom, the method comprising the steps of:

detecting light emitted from a plurality of light sources associated with a plane of an input device by analyzing an image of the input device;

associating each of the light sources with a corresponding label;

determining the position and orientation information from the positions of the light sources in the image; and communicating the position and orientation information to at least one application running on a computer system;

wherein the step of associating each of the light sources with a corresponding label further comprises determining the corresponding label for each of the light sources at least in part using a measure which is a function of a set of corresponding points associated with the plane of the input device, with a given one of the set of corresponding points selected as a principal point.

8. The method of claim 7 wherein the plurality of light sources includes a set of at least five principal light sources used to determine the position and orientation information.

9. The method of claim 7 further including the step of detecting light emitted from one or more additional light sources in order to provide additional control information to the application.

10. The method of claim 7 wherein the degrees of freedom include one or more of X, Y and Z positional parameters and roll, pitch and yaw rotational parameters.

11. The method of claim 7 wherein the input device provides control over at least six control parameters.

12. The method of claim 7 wherein the measure is invariant under perspective projection, such that if the set of points associated with the plane of the input device are projected into an image, the measure generated for the sets of points associated with the plane of the input device is the same as that generated for the points as projected into the image.

13. The method of claim 7 wherein the step of determining the position and orientation information includes determining the orientation information by directly calculating roll, pitch and yaw rotational parameters from computed translational vectors.

14. An input device for providing position and orientation information with a number of degrees of freedom, the device comprising:

a handle;

a plate attached to an upper portion of the handle and having a planar surface, the planar surface having a plurality of light sources associated therewith, such that a detection device arranged in proximity to the planar surface detects light from at least a subset of the light sources in order to determine position and orientation information regarding the input device;

wherein the detection device comprises a camera, and further wherein control software of a computer system processes images generated by the camera to determine the position and orientation information; and wherein the control software detects and localizes the light sources that are visible in a given one of the images, associates each of the light sources with a corresponding label, determines the position and orientation information from the positions of the light sources in the image, and communicates the position and orientation information to at least one application running on the computer system.

15. The input device of claim 14 wherein at least a subset of the plurality of light sources comprise light emitting diodes.

16. The input device of claim 14 wherein the plurality of light sources includes a set of at least five principal light sources used to determine the position and orientation information.

17. The input device of claim 16 further including an on/off switch arranged on the handle, wherein the five principal light sources are on when the on/off switch is in an on position, and off when the on/off switch is in an off position.

18. The input device of claim 14 wherein the plurality of light sources includes at least one trigger light source which provides an indication of the state of a corresponding trigger switch arranged on the handle.

19. The input device of claim 14 wherein the plurality of light sources includes an up indicator light source and a down indicator light source, each providing an indication as to whether an up/down switch arranged on the handle is in an up position or a down position.

20. The input device of claim 6 wherein the up/down switch includes an actuation member protruding from a side of the handle, wherein the actuation member is adapted to receive a finger of a user, such that a movement of the actuation member by the user in a first direction turns on the up indicator light source and turns off the down indicator light source, and a movement of the actuation member by the user in a second direction turns on the down indicator light source and turns off the up indicator light source.

21. The input device of claim 14 wherein the degrees of freedom include one or more of X, Y and Z positional parameters and roll, pitch and yaw rotational parameters.

22. The input device of claim 14 wherein the device provides control over at least six control parameters.

23. The input device of claim 14 wherein a lower portion of the handle is adapted for slidable engagement with a support device.

24. The input device of claim 14 wherein the control software determines the corresponding label for each of the light sources at least in part using a measure which is a function of a set of corresponding points associated with the planar surface, with a given one of the points selected as a principal point.

25. The input device of claim 24 wherein the measure is invariant under perspective projection, such that if the set of points associated with the planar surface are projected into an image, the measure generated for the sets of points associated with the planar surface is the same as that generated for the points as projected into the image.

26. A method for providing position and orientation information with a number of degrees of freedom, the method comprising the steps of:

detecting light emitted from a plurality of light sources associated with a plane of an input device by analyzing an image of the input device;

associating each of the light sources with a corresponding label;

determining the position and orientation information from the positions of the light sources in the image; and communicating the position and orientation information to at least one application running on a computer system;

wherein the step of associating each of the light sources with a corresponding label further comprises determining the corresponding label for each of the light sources at least in part using a measure which is a function of a set of corresponding points associated with the plane of the input device, with a given one of the set of corresponding points selected as a principal point.

* * * * *

UNITED STATES PATENT AND TRADEMARK OFFICE
CERTIFICATE OF CORRECTION

PATENT NO. : 6,417,836 B1
DATED : July 9, 2002
INVENTOR(S) : Kumar et al.

It is certified that error appears in the above-identified patent and that said Letters Patent is hereby corrected as shown below:

<u>Column 14,</u>
Line 41, please change "of claim 6" to -- of claim 19 --.

Signed and Sealed this

Seventeenth Day of June, 2003

JAMES E. ROGAN
*Director of the United States Patent and Trademark Office*